(12) United States Patent
Ambrosini et al.

(10) Patent No.: US 9,018,130 B2
(45) Date of Patent: Apr. 28, 2015

(54) HONEYCOMB STRUCTURAL BODY FOR EXHAUST GAS PURIFICATION

(75) Inventors: Tiziano Ambrosini, Arese (IT); Agustin Sin Xicola, Arese (IT)

(73) Assignee: Pirelli & C. Eco Technology S.p.A., Milan (IT)

( * ) Notice: Subject to any disclaimer, the term of this patent is extended or adjusted under 35 U.S.C. 154(b) by 643 days.

(21) Appl. No.: 13/121,663

(22) PCT Filed: Sep. 30, 2008

(86) PCT No.: PCT/IT2008/000623
§ 371 (c)(1),
(2), (4) Date: Jun. 13, 2011

(87) PCT Pub. No.: WO2010/038245
PCT Pub. Date: Apr. 8, 2010

(65) Prior Publication Data
US 2011/0237431 A1 Sep. 29, 2011

(51) Int. Cl.
*B01J 23/02* (2006.01)
*B01J 23/04* (2006.01)
(Continued)

(52) U.S. Cl.
CPC .............. *C04B 37/005* (2013.01); *C04B 28/24* (2013.01); *C04B 35/565* (2013.01);
(Continued)

(58) Field of Classification Search
CPC .... C04B 37/005; C04B 28/24; C04B 35/565; C04B 38/0019; C04B 2235/3418; C04B 2235/5232; C04B 2235/526; C04B 2235/5264; C04B 2235/5436; C04B 2235/5445; C04B 2235/5472; C04B 2237/083; C04B 2237/365

USPC .............. 264/628–631, 654–682; 501/15; 428/698; 502/527.11–527.24
See application file for complete search history.

(56) References Cited

U.S. PATENT DOCUMENTS 4,595,662 A 6/1986 Mochida et al.
6,777,114 B2 8/2004 Tomita et al.
(Continued)

FOREIGN PATENT DOCUMENTS

EP 0 816 065 B1 11/2003
EP 1 452 511 A1 9/2004
(Continued)

OTHER PUBLICATIONS

Stobbe et al., "SiC As a Substrate for Diesel Particulate Filters," SAE Technical Paper Series, pp. 1-10, (Sep. 13-15, 1993).
(Continued)

*Primary Examiner* — Jennifer A Smith
(74) *Attorney, Agent, or Firm* — Finnegan, Henderson, Farabow, Garrett & Dunner, L.L.P.

(57) ABSTRACT

A honeycomb structural body and a method for the manufacturing thereof. The manufacturing method includes (i) providing a plurality of silicon carbide honeycomb segments, each having a cell structure and at least one outer wall; (ii) subjecting the honeycomb segments to an oxidizing thermal treatment forming a surface layer of silicon oxides on the at least one outer wall; and (iii) bonding the plurality of oxidized honeycomb segments so as to form the honeycomb structural body in the substantial absence of organic binders with the interposition of a sealing material including a mixture of one or more silicon carbide powders, one or more ceramic fibers, and one or more inorganic binders.

15 Claims, 2 Drawing Sheets

(51) Int. Cl.
*C04B 37/00* (2006.01)
*C04B 28/24* (2006.01)
*C04B 35/565* (2006.01)
*C04B 38/00* (2006.01)

(52) U.S. Cl.
CPC ........ *C04B 38/0006* (2013.01); *C04B 38/0019* (2013.01); *C04B 2235/3418* (2013.01); *C04B 2235/5232* (2013.01); *C04B 2235/526* (2013.01); *C04B 2235/5264* (2013.01); *C04B 2235/5436* (2013.01); *C04B 2235/5445* (2013.01); *C04B 2235/5472* (2013.01); *C04B 2237/083* (2013.01); *C04B 2237/365* (2013.01); *Y10S 502/52712* (2013.01); *Y10S 502/52715* (2013.01); *Y10S 502/52716* (2013.01); *Y10S 502/52719* (2013.01)

(56) References Cited

U.S. PATENT DOCUMENTS

| | | |
|---|---|---|
| 2004/0097370 A1 | 5/2004 | Ichikawa et al. |
| 2005/0079975 A1 | 4/2005 | Fujita |
| 2006/0216466 A1 | 9/2006 | Yoshida |
| 2009/0011178 A1 | 1/2009 | Masukawa et al. |

FOREIGN PATENT DOCUMENTS

| | | |
|---|---|---|
| EP | 1 707 546 A1 | 10/2006 |
| EP | 1 997 789 A1 | 12/2008 |
| JP | 7054643 | 2/1995 |
| WO | WO-2007/119407 A1 | 10/2007 |

OTHER PUBLICATIONS

"Testing Method for Flexural Strength (Modulus of Rupture) of Fine Ceramics," Japanese Industrial Standard, JIS R 1601, pp. (i) and 1-4, (1995).

International Search Report from the European Patent Office for International Application No. PCT/IT2008/000623 (Mail date: Apr. 23, 2009).

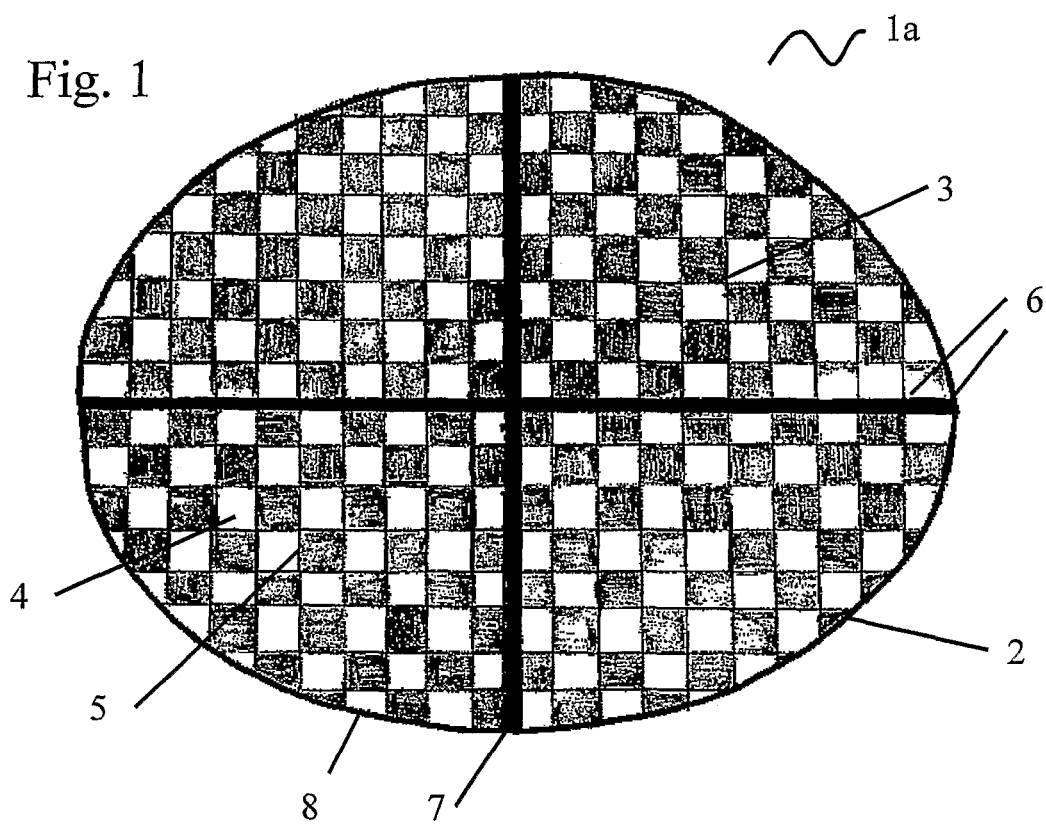
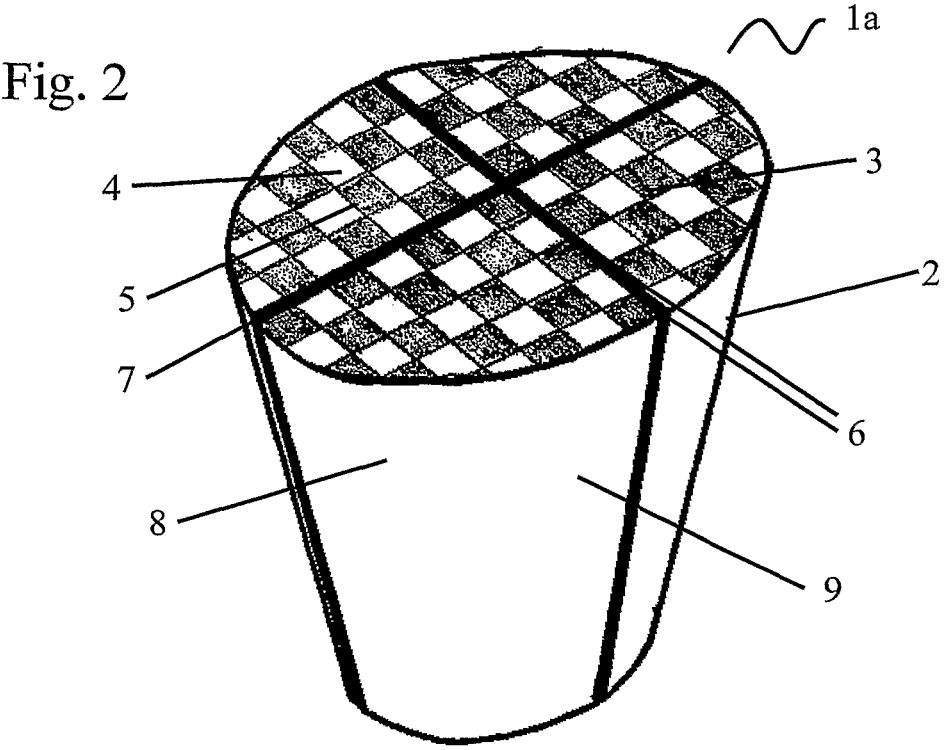

HONEYCOMB STRUCTURAL BODY FOR EXHAUST GAS PURIFICATION

CROSS REFERENCE TO RELATED APPLICATION

This application is a national phase application based on PCT/IT2008/000623, filed Sep. 30, 2008, the content of which is incorporated herein by reference.

FIELD OF THE INVENTION

The present invention relates to a honeycomb structural body, comprising honeycomb segments and a sealing material layer, and more particularly to a honeycomb structural body suitable for use in a particulate filter of exhaust gas emitted by a vehicle.

BACKGROUND OF THE INVENTION

With the term "exhaust gas" it is intended a flue gas that is produced as a result of the combustion of fuels, such gasoline/petrol, diesel, fuel oil or coal. The ever increasing diffusion of power plants, industrial process plants, and motor vehicles in the world, has urgently led to the study of possible solutions for reducing the harmful effects of the exhaust gases on the environment and on the man.

Indeed, although the largest part of most exhaust gases is relatively harmless nitrogen, water vapor (exception made for pure-carbon fuels), and carbon dioxide (with the exception of hydrogen as fuel), a relatively small part thereof is formed by undesirable toxic substances, such as carbon monoxide, hydrocarbons, nitrogen oxides, partly unburned fuel, and particulate matter.

Generally speaking, with the term "particulate matter" (briefly referred to as "PM") it is intended solid or liquid particles suspended in a gas. In an exhaust gas, such as the exhaust gas produced by a diesel engine, the main fraction of PM is composed of very small particles, mainly consisting of impure carbon particles (in jargon, also referred to as "soot"). Because of their small size, said particles, when inhaled, may easily penetrate deep into the lungs. The rough surfaces of these particles make it easy for them to bind with other toxins in the environment, thus increasing the hazards of particle inhalation. The discharge amount of PM becomes large in a diesel engine using a gas oil as a fuel or a direct-injection type gasoline engine recently coming into wide use.

A solution for removing (or at least reducing) the PM emissions of an exhaust gas produced by fuel combustion, e.g., in a vehicle engine, provides for the use of a particulate filter. Making reference to the exhaust gas produced by a diesel engine, a particulate filter—in this case, referred to as Diesel Particulate Filter (DPF)—is a device arranged in an exhaust gas emission path of the diesel engine for receiving the exhaust gas and retain the PM included thereinto.

A conventional DPF may consist of a cylindrical body made of porous material, such as silicon carbide (SiC), with a first base (upstream side) receiving the flow of the exhaust gas produced by the engine. Such DPF has a honeycomb structure, with a plurality of exhaust gas flowing channels extending in parallel to the longitudinal direction of the cylindrical body, from the upstream side body to a downstream side, corresponding to a second base of the cylindrical body opposite to the first one. These channels are alternatively plugged at either the upstream side or the downstream side to form a checker pattern.

The exhaust gas (including PM) hits the first surface, and is forced to flow through the channels of the DPF that are not plugged at the upstream side. Thanks to the porosity properties of the SiC, the PM included in the exhaust gas is blocked by the walls of said channels, and remain confined in the DPF, while the rest of the exhaust gas (essentially free of PM) crosses the walls, passes into the adjacent channels and exits from the DPF, for being outputted outside the vehicle through exhaust pipes.

Heretofore, as the honeycomb structural body used in the exhaust gas converting apparatus for vehicles, there is well known a one-piece type honeycomb structure (called as a honeycomb monolith) made of a low thermal expansive cordierite. This type of the honeycomb structural body is used by carrying a material having a high specific surface area such as active alumina or the like, a catalyst of a noble metal such as platinum or the like, and an alkali metal for the NOx converting treatment on the wall surface.

As another example of the honeycomb structural body, there is also known an aggregate type honeycomb structural body formed by integrally bonding a plurality of honeycomb structural units (honeycomb segments) comprising a silicon carbide material prepared by extrusion molding.

JP07-054643 discloses an exhaust emission control device manufactured by combining and arranging twelve pieces of filters formed into a honeycomb shape by a porous silicon carbide sintered body. A seal member serving as a heat resistant filling material is interposed between the filters adjacent to each other, and its periphery is covered by a heat insulating member. The seal member is comprised of a ceramic fiber, a silicon carbide powder, and an inorganic binder.

EP 816065 discloses a ceramic structure in which a plurality of the ceramic members are integrally adhered by interposing a sealing member of an elastic material consisting of inorganic fibers, preferably a ceramic fiber, an inorganic binder, preferably a colloidal sol, an organic binder, preferably a polysaccharide, and inorganic particles, preferably inorganic powder or whisker selected from a carbide and a nitride, and mutually bonded three-dimensionally intersected organic fibers and inorganic particles through the inorganic binder and organic binder between the mutual ceramic members. More in particular, the ceramic fiber is selected from silica-alumina, mullite, alumina and silica, the colloidal sol is selected from silica sol and alumina sol, the polysaccharide is selected from polyvinyl alcohol, methyl cellulose, ethyl cellulose and carboxymethyl cellulose, and the inorganic powder or whisker is selected from silicon carbide, silicon nitride and boron nitride. More preferably, the sealing member consists of silica-alumina ceramic fiber, silica sol, carboxymethyl cellulose and silicon carbide powder.

U.S. Pat. No. 6,777,114 discloses that when a silicon carbide-based honeycomb filter having a structure bonded by metallic silicon is used as a DPF and then is reactivated, oxidation reactions under a low oxygen partial pressure may take place causing the destruction of the filter caused by sharp temperature increase due to the oxidation of, in particular, metallic silicon. Further metallic silicon has a property of easily dissolving in an acid when having no oxide film thereon. As a result, when a sintered body containing metallic silicon as a constituent is used as a DPF, the sintered body is exposed to an acidic gas atmosphere generated by the combustion of sulfur, etc. present in the fuel used; and there has been a fear of, for example, the destruction of the filter caused by dissolution of metallic silicon. Therefore, the formation of an oxygen-containing phase at the surface of the silicon carbide particles and/or the metallic silicon or in the vicinity of the surface is suggested to suppress the oxidative decomposition of the silicon carbide and the metallic silicon.

P. Stobbe et al, "SiC as a Substrate for Diesel Particulate Filters", SAE Technical Paper Series 932495, 1993 discloses that one possible concern of the use of SiC as diesel filter may be that of high temperature corrosion. The authors explain that silicon carbide oxidizes relatively easily in connection with atmospheric air according to reaction (I), thereby forming a tight layer of amorphous silica on the surface of the material.

$$SiC + 2O_2 \rightarrow SiO_2 + CO_2 \quad (I)$$

The reference also discloses that at 900° C., the oxidation can reach a depth of about 0.05 μm and this corresponds to a reduction of the contact area (SiC—SiC) between the sintered grains of approximately 0.2%, and at 1500° C., the reduction of the contact area can be about 1%, so that for extreme temperature excursions, the layer can crack and therefore allow local free passage of oxygen to the SiC, and a consequent increase in the rate of oxidation.

SUMMARY OF THE INVENTION

The Applicant has faced the problem of providing a honeycomb structural body, particularly suited for a diesel particulate filter, comprising honeycomb segments bonded together with the aid of a sealing material, having a high bonding strength, an excellent durability, and a high resistance to thermal stress that is exerted on the honeycomb structural body during regenerating processes and operations.

Contrarily to the disadvantages reported in the above cited documents, the Applicant has unexpectedly found that an oxidation layer formed on the outer walls of silicon carbide honeycomb segments can significantly improve the bonding of the segments in the honeycomb structural body.

More particularly, the Applicant has unexpectedly found that a honeycomb structural body, being excellent in the bonding strength and thermal shock resistance at the joint portion of the honeycomb segments and capable of maintaining a good durability for a long time, can be obtained by forming an oxidation layer on the outer walls of silicon carbide honeycomb segments and by performing the bonding of the thus obtained oxidized segments with the aid of a sealing material comprising a mixture of one or more silicon carbide powder, one or more ceramic fiber, and one or more inorganic binder, in substantial absence of organic binders. In particular, it has been surprisingly found that the cooperation between the above mentioned sealing material and the oxidation layer allows obtaining a significantly increased bonding strength in the bonded honeycomb structural body.

In a first aspect, the invention relates to a method for the manufacturing of a honeycomb structural body comprising the steps of (i) providing a plurality of silicon carbide honeycomb segments each having a cell structure and at least one outer wall, (ii) subjecting said honeycomb segments to an oxidizing thermal treatment forming a surface layer of silicon oxides on said at least one outer wall, and (iii) bonding said plurality of oxidized honeycomb segments so as to form said honeycomb structural body in the substantial absence of organic binders with the interposition of a sealing material comprising a mixture of one or more silicon carbide powder, one or more ceramic fiber, and one or more inorganic binder.

In a second aspect, the invention relates to a honeycomb structural body comprising a plurality of honeycomb segments each having a cell structure and at least one outer wall, wherein said honeycomb segments are bonded to each other at the outer walls by the interposition of a sealing layer cooperating with a surface layer of silicon oxides formed on said outer walls, wherein said sealing layer comprises a sealing material comprising a mixture of one or more silicon carbide powder, one or more ceramic fiber, and one or more inorganic binder, and wherein said sealing material is substantially free of organic binders.

Preferably, the step of providing a plurality of silicon carbide honeycomb segments comprises mixing one or more silicon carbide powder, one or more organic binder, one or more dispersing agent and one or more solvent to form a starting paste. The formed starting paste may be advantageously extruded to form a green honeycomb structure. The formed green honeycomb structure may then be advantageously sintered at a temperature of from 1,500° to 3,000° C. under an oxygen-free atmosphere. More preferably, the green honeycomb structure is dried to remove solvent(s). Still more preferably the green honeycomb structure is debinded to remove organic compound(s).

Advantageously, the step of subjecting said honeycomb segments to an oxidizing thermal treatment forming a surface layer of silicon oxides on said at least one outer wall may be performed by thermal treating the honeycomb segments in an oxygen-containing atmosphere at a temperature ranging from 500° to 1,400°. Preferably, the thermal treatment is performed from 600° to 1,300° C. More preferably, the thermal treatment is performed from 700° to 1,200°. The thermal treatment can be performed for a period of time of from 1 to 15 hours. More preferably the thermal treatment is performed from 1 to 10 hours.

The Applicant has found that when the thermal treatment temperature and time is specified as above, an optimal thickness of the layer of silicon oxides is formed on the outer walls of the honeycomb segment(s).

Preferably, the layer of silicon oxides has a thickness of from 0.001 μm to 10 μm. In preferred embodiments, the silicon oxides may comprise amorphous or crystalline $SiO_2$, or SiO, or a mixture thereof.

The Applicant has found that owing to the presence of an oxidation layer on the outer walls of the honeycomb segment and/or in the vicinity of the outer walls, the adhesion properties of the honeycomb segment can be significantly improved.

Preferably, the step of bonding the plurality of oxidized honeycomb segments comprises applying a sealing layer on at least one outer wall of a honeycomb segment. At least two outer walls of said honeycomb segments are advantageously joined so as to interpose said sealing layer. The joined honeycomb segments are then typically cured.

Particularly, the honeycomb structural body preferably comprises from 2 to 10 honeycomb segments. More preferably, the honeycomb structural body comprises from 4 to 8 honeycomb segments.

Advantageously, a coating layer can be further applied onto the outer peripheral portion of the honeycomb structural body.

The Applicant has found that the coating layer is preferable for protecting the outer peripheral portion of the honeycomb structural body and increasing its strength.

In preferred embodiments, the sealing material has a viscosity value lower than 200 Pa·s (pascal per second). More preferably, the sealing material has a viscosity value in the range of from 100 to 180 Pa·s.

The Applicant has observed that these viscosity values imply that the sealing material has an improved fluidity and wettability on the surface of the honeycomb segments. The Applicant believes that this improves the interface interaction between the surface of the oxidized honeycomb segments and the surface of the sealing material, which results in an increased interpenetration of the sealing material and an increased adhesion strength.

In preferred embodiments, the sealing material comprises from about 20% to about 80% by weight of silicon carbide powder. The amount of ceramic fiber in the sealing material is preferably comprised from about 5% to about 50% by weight. The amount of inorganic binder in the sealing material is preferably comprised from about 1% to about 20% by weight.

Preferably, the silicon carbide powder has an average particle diameter lower than 10 µm.

Preferably, the ceramic fiber is selected from alkaline and alkaline earth silicate fibers.

Preferably, the inorganic binder is selected from alumina sol, silica sol, titania sol, water glass and mixture thereof.

The Applicant has found that the sealing material having the composition as described above provides to the honeycomb structural body an excellent durability and a high resistance to thermal stress.

Preferably, said sealing layer has a thickness of about 0.1 to 8 mm.

BRIEF DESCRIPTION OF THE DRAWINGS

Further features and advantages will become more apparent from the detailed description which follows. This description will be set out hereinafter with reference to the accompanying drawings, given by way of non-limiting example, in which:

FIG. 1 is a top-view of a cylindrical honeycomb structural body according to an embodiment of the present invention comprising four honeycomb segments;

FIG. 2 is a diagrammatic perspective view of the honeycomb structural body of FIG. 1;

DETAILED DESCRIPTION OF EXEMPLARY EMBODIMENTS OF THE INVENTION

Figure 3:
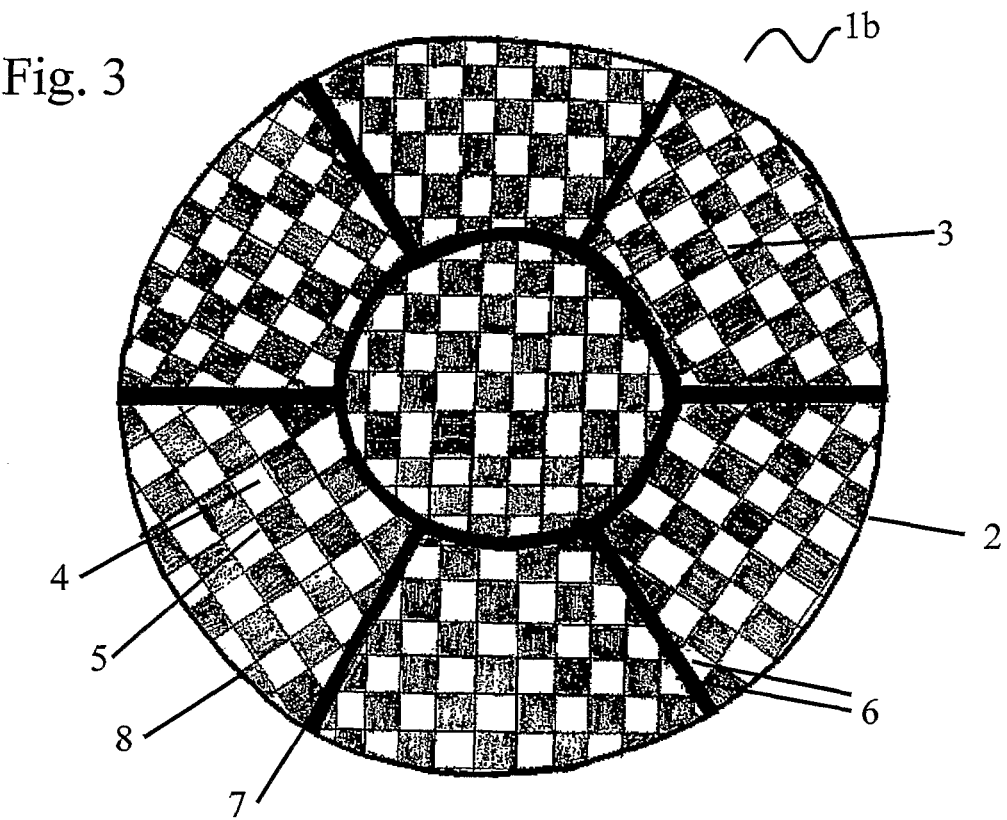
FIG. 3 is a top-view of a cylindrical honeycomb structural body according to a further embodiment of the present invention comprising seven honeycomb segments.

An example of a production method of the honeycomb structural body and of a honeycomb structural body according to the invention will be described below.

Firstly, in order to provide honeycomb segments for the honeycomb structural body a starting paste mainly composed of one or more silicon carbide powder, one or more organic binder, one or more dispersing agent and one or more solvent is prepared.

There is no particular limitation about the silicon carbide powder, and any silicon carbide powder can be used in the manufacturing of the starting paste. Preferably, the silicon carbide powder has an average particle diameter lower than 100 µm. More preferably, the silicon carbide powder is a mixture of at least one silicon carbide powder having a high average particle diameter, i.e. from 10 to 100 µm, and at least one silicon carbide powder having a low average particle diameter, i.e. from 10 to 0.01 µm. Most preferably, the silicon carbide powder is a mixture of a silicon carbide powder having an average particle diameter ranging from 25 to 75 µm and a silicon carbide powder having an average particle diameter ranging from 1 to 0.1 µm.

As the organic binder may be used, for example, one or more organic binders selected from methylcellulose, carboxymethyl cellulose, hydroxyethyl cellulose, polyethylene glycol, phenolic resin and epoxy resin. The amount of the organic binder is preferably 1 to 10 parts by weight based on 100 parts by weight of the total amount of silicon carbide powder.

As the dispersing agent may be used, for example, ethylene glycol, dextrin, aliphatic acid, aliphatic acid soap, polyvinyl alcohol, polyethylene glycol and the like. The amount of the dispersing agent is preferably 1 to 10 parts by weight based on 100 parts by weight of the total amount of silicon carbide powder.

As the solvent may be used, for example, water, organic solvent (benzene or the like), alcohol and so on.

The starting paste is preferably well mixed and kneaded. For example, it may be mixed by using a mixer, or sufficiently kneaded by means of a kneader or the like. The starting paste is extrusion-molded to form a green honeycomb structure having through-holes, for example, by means of the extrusion molding. The green honeycomb structure can be preferably extruded with a predefined shape, for example, a polygonal shape, a cylinder shape, a circular sector shape, a circular corona sector shape, and the like.

Next, the resulting green honeycomb structure is cut to the desired length in order to give the green honeycomb segment, which is subsequently dried. As a drying machine used for the drying may be used, for example, a microwave drying machine, a hot-air drying machine, a dielectric drying machine, a reduced-pressure drying machine, a vacuum drying machine, a freeze drying machine and the like.

Then, the dried green honeycomb segment is subjected to the debinding for the removal of organic compounds. The condition for the debinding is properly adjusted according to the kind or amount of the organic matter contained in the green honeycomb segment, but a condition of, for example, approximately 400° C. for 2 hours is preferable.

After that, the dried and degreased green honeycomb segment is sintered. The sintering is conducted, for example, at a temperature of from 1,500 to 3,000° C., preferably from 2,000° C. to 2,500° C., and most preferably of about 2400° C. The sintering time ranges from 1 to 10 hours, and preferably from 1 to 5 hours. The sintering is conducted in an atmosphere substantially free of oxygen, for example, under argon atmosphere.

Finally, the sintered honeycomb segment is subjected to a thermal treatment in the presence of oxygen. The thermal treatment in an oxygen-containing atmosphere is carried out preferably at a temperature ranging from 500 to 1,400° C., more preferably from 600 to 1,300° C., further preferably at 700 to 1,200° C. The thermal treatment is conducted for a period of time of from 1 to 15 hours, preferably from 1 to 10 hours. Thus, according to the process of the present invention, particularly wherein the thermal treatment temperature and time is specified as above, a layer of silicon oxides is effectively formed on the outer walls of the honeycomb segment.

In the honeycomb segment used in the present invention, the silicon oxides constituting the surface layer may preferably be amorphous and/or crystalline $SiO_2$, SiO, or a mixture thereof, more preferably, amorphous and/or crystalline $SiO_2$. The surface layer of silicon oxides has preferably a thickness of from 0.001 to 10 µm, more preferably from 0.1 to 10 µm, and most preferably from 1 to 10 µm.

The Applicant has found that owing to the presence of an oxidation layer on the outer walls of the honeycomb segment and/or in the vicinity of the outer walls, the adhesion properties of the honeycomb segment can be significantly improved.

Then, a sealing material paste forming a sealing layer is applied onto the oxidized outer walls of the obtained honeycomb segments, whereby the honeycomb segments are joined with each other and then dried to form a bonded honeycomb structural body having the desired shape and size.

The sealing material comprises a mixture of at least one silicon carbide powder, at least one ceramic fiber, and at least one inorganic binder. Preferably, the sealing material essentially consists of a mixture of at least one silicon carbide powder, at least one ceramic fiber, and at least one inorganic binder. In particular, substantially no organic binders are used in the sealing material.

There is no particular limitation about the silicon carbide powder, and any silicon carbide powder can be used in the manufacturing of the sealing material. Preferably, the silicon carbide powder has an average particle diameter lower than 10 µm, more preferably lower than 5 µm, and most preferably lower than 1 µm.

The silicon carbide powder is present in an amount of from about 20% to about 80% by weight and preferably from about 30% to about 60% by weight of the sealing material.

The ceramic fibers used in the present invention are any suitable ceramic fiber but are usually high temperature resistant fibers, such as alumino-silicate, silica-alumina, mullite, alumina and silicate fibers. Each of these may be used alone, or two or more kinds of these may be used in combination. Among the ceramic fibers, alkaline earth silicate fibers are more desirably used.

Suitable ceramic fibers usually have diameters of from about 0.5 to about 20 µm and lengths of from about 0.5 to about 50 mm. Other ceramic fibers which can be used include basalt rock wool and fiberglass.

The ceramic fiber is present in an amount of from about 5% to about 50% and preferably from about 10% to about 30% by weight of the sealing material.

As the inorganic binder may be used, for example, an inorganic colloidal solution.

Useful examples of inorganic colloidal solution comprise, for example, one or more inorganic colloidal solution selected from alumina sol, silica sol, titania sol, water glass and the like.

The colloidal silica used in accordance with the present invention can be essentially any colloidal silica; however, the most desirable colloidal silicas are those which have the smaller average particle size and which can be easily dispersed.

The inorganic binder is present in an amount of from about 1 to about 20 percent and preferably from about 5 to about 10 percent by weight of the sealing material.

The sealing material preferably has a viscosity value lower than 200 Pa·s (pascal per second), preferably in the range of from 100 to 180 Pa·s at 25° C., when measured with a Bohlin rheometer shear rate 1 s$^{-1}$, rotor plate-plate 40 mm diameter and gap of 1,500/2,000 micron. These viscosity values imply that the sealing material has an improved fluidity and wettability on the surface of the honeycomb segments. This results in an improved interface interaction between the surface of the honeycomb segments and the surface of the sealing material, which results in an increased interpenetration of the sealing material and an increased adhesion strength.

The sealing layer formed for joining the honeycomb segments with each other preferably has a thickness of about 0.1 to 8 mm. When the thickness is less than 0.1 mm, there is a fear that a sufficient bonding strength is not obtained. While, when the thickness of the sealing material layer exceeds 8 mm, it has a portion not functioning as an exhaust gas conversion, so that the specific surface area per unit volume of the honeycomb structural body lowers and the catalyst component can not be sufficiently dispersed.

It is preferable that the number of the bonded honeycomb segments is properly determined in accordance with the size of the honeycomb structural body. Preferably, the number of the bonded honeycomb segments is not higher than twelve. According to a preferred embodiment of the present invention the number of the bonded honeycomb segments ranges from 2 to 10, more preferably from 4 to 8.

A sealing material may be applied onto the outer peripheral portion of the honeycomb structural body or the side surface thereof not opening the through-holes. The sealing material may be dried to form a coating layer for the purpose of the gas sealing. The coating layer is preferable for protecting the outer peripheral portion of the honeycomb structural body and increasing its strength.

In this case, the coating material is not particularly limited, but may be made of the same material as the above sealing material or a different material.

The coating material may have the same compounding ratio as in the sealing material layer or a different compounding ratio. The thickness of the coating material layer is preferably approximately 0.1 to 2 mm. When the thickness is less than 0.1 mm, the protection of the outer peripheral surface becomes insufficient and the strength can not be enhanced. While, when it exceeds 2 mm, the specific surface area per unit volume as a honeycomb structural body lowers.

After a plurality of honeycomb segments are joined through the sealing material, and optionally, after the formation of the coating layer, the joined structure is cured.

The curing of the structure is preferably conducted under a condition of about 800° C. for 1 hour, though the conditions may vary according to the kind or amount of the included organic matter.

Figure 4:
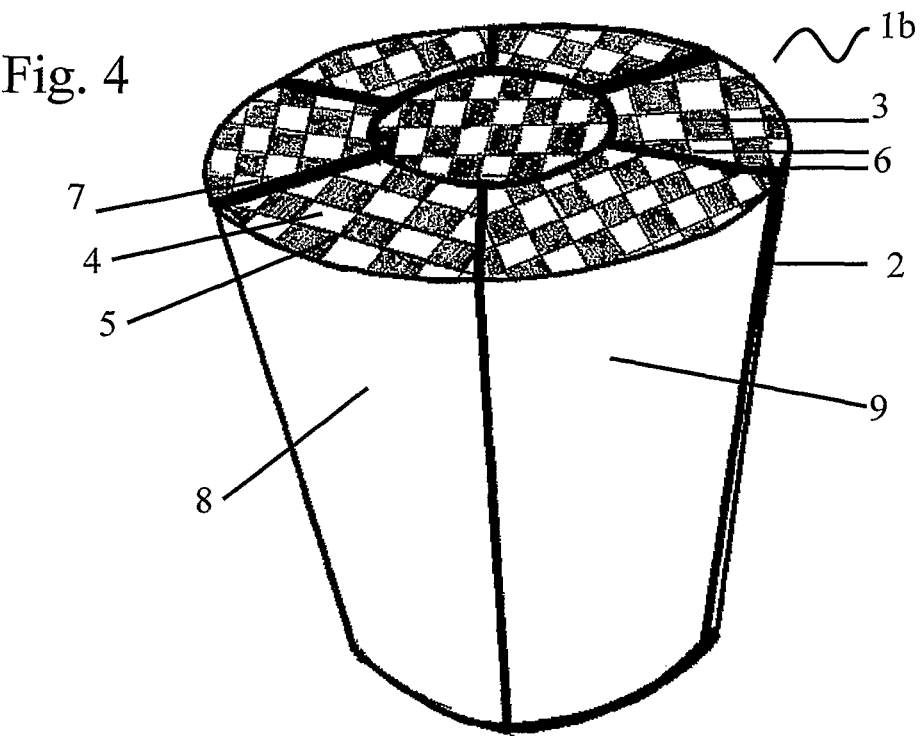
FIG. 4 is a diagrammatic perspective view of the honeycomb structural body of FIG. 3.

The honeycomb structural bodies shown in FIGS. 1 to 4 are examples of the invention, but the invention is not limited only thereto. A man skilled in the art can easily conceive other shapes for the honeycomb structural body, for example, rectangular shape or elliptical shape, as well as other shapes for the honeycomb segments employed to realize the structural body.

The honeycomb structural bodies 1a, 1b shown in FIGS. 1 to 4 comprise a plurality of honeycomb segments 2 each having a cell structure 3 comprising cells 4 and cell walls 5. These cells 4 are alternatively plugged at either the upstream side or the downstream side to form a checker pattern. Each honeycomb segment 2 comprises outer walls 6 bonded each other by the interposition of a sealing layer 7 and peripheral walls 8, optionally covered by a coating layer 9.

The thickness (wall thickness) of the cell wall is not particularly limited, but is preferably about 0.05 to 1 mm. When the wall thickness is less than 0.05 mm, the strength of the porous honeycomb body lowers, while when it exceeds 1 mm, the exhaust gas does not sufficiently penetrate into the interior of the wall and does not contact with the catalyst carried in the interior of the wall, and hence the catalytic action lowers. Moreover, the thickness of the cell wall is preferably approximately 0.10 to 0.80 mm, more preferably 0.15 to 0.60 mm.

The number of the through-holes per unit cross sectional area is preferably approximately 15.5 to 186 holes/cm$^2$ (100 to 1200 cpsi). When the number of the though-holes is less than 15.5 holes/cm$^2$, the area of the wall contacting with the exhaust gas becomes small, while when it exceeds 186 holes/cm$^2$, the pressure loss becomes high and it is difficult to prepare the porous honeycomb unit. The number of the through-holes is preferably approximately 46.5 to 170.5 holes/cm$^2$ (300 to 1100 cpsi), more preferably approximately 62.0 to 155 holes/cm$^2$ (400 to 1000 cpsi).

The cross sectional shape of the cell formed on the honeycomb segment (hereinafter, referred to as "cell cross section") is preferably polygonal, for example, triangle, quadrilateral (square), rectangular, trapezoidal, pentagonal, hexagonal, octagonal and the like, or may be of various polygons. For example, the cross section may be approximately triangle or hexagon. In this case, it is considered to enhance the strength of the porous honeycomb unit to increase the strength of the honeycomb structural body (e.g. isostatic strength or the like) without lowering the pressure loss, exhaust gas conversion capability and the like.

The honeycomb structural body according to the invention may be used in the form of a honeycomb catalyst obtained by carrying a catalyst component in the cell walls (on the surfaces of the particles) or on the surfaces of the cell walls. For example, a noble metal, an alkali metal compound, an alkaline earth metal compound, an oxide and the like may be used as catalyst component. One or more metals selected from platinum, palladium, and rhodium may be used as noble metal. As the alkali metal compound, for example, one or more compounds selected from potassium, sodium and the like may be used. As the alkaline earth metal compound, for example, a compound of barium or the like may be used. As the oxide, perovskite ($La_{0.75}K_{0.25}MnO_3$), $CeO_2$ or the like may be used.

Such a honeycomb catalyst can be used, for example, as a so-called three-way catalyst, or NOx absorption catalyst for the conversion of the exhaust gas discharged from automobiles. Moreover, the catalyst component may be carried on the surfaces of the cell walls after the production of the honeycomb structural body, or on the surface of the each ceramic particle as the starting material in the production of the honeycomb units. The carrying of the catalyst component can be conducted, for example, by the impregnation method or the like.

The present invention will be further illustrated below by means of a number of preparation examples, which are given for purely indicative purposes and without any limitation of this invention.

EXAMPLE 1

Preparation of the Honeycomb Segment

A mixed composition is prepared by mixing for 30 minutes under dry conditions in a vessel equipped with a rotating mixer 63 parts by weight of silicon carbide particles having average particle diameter of about 60 μm, 12 parts by weight of silicon carbide particles having average particle diameter of about 0.5 μm, 5 parts by weight of methylcellulose, and 1.25 parts by weight of a fatty acid (Lipestrol EOG). Then, a solution of polyethylene glycol (PEG 400) in water was added and the resulting paste was mixed for about 30 minutes.

The resulting paste was extrusion-molded by means of an extruder to obtain a green honeycomb segment having a rectangular shape and with a cell density of about 180 cpsi (cells per square inch).

Then, the green honeycomb segment was cut at the proper length and sufficiently dried by using a microwave drying machine and a hot-air drying machine and debinded to remove organic residuals by holding at 500° C. for 1 hour.

Thereafter, the green honeycomb segment was sintered under argon atmosphere at about 2,000°-2400° C. for about 2 hours to obtain a sample of a honeycomb segment A made of porous silicon carbide.

Finally, the honeycomb segment A was thermally treated under normal atmosphere at 850°-1150° C. for about 1 hour to form the surface layer of silicon oxides and to give the honeycomb segment B.

Preparation of the Sealing Material

A paste for a sealing material was prepared by mixing 44 parts by weight of silicon carbide powder having average particle diameter of 0.5 μm, 20 parts by weight of ceramic fibers (alkaline earth silicate fibers) having an average fiber diameter of 3-5 micron and an average fiber length of 600 micron, about 7 parts by weight of colloidal silica, and about 29 parts by weight of water, which was used as paste 1. The viscosity of the sealing material was 120 Pa·s (measured with a Bohlin rheometer at 25° C., shear rate 1 $s^{-1}$, rotor plate-plate 40 mm diameter and gap of 1,500/2,000 μm).

Another paste for a sealing material was prepared by mixing 30 parts by weight of silicon carbide powder having average particle diameter of 0.5 μm, 25 parts by weight of short ceramic fibers (alkaline earth silicate fibers) having an average fiber diameter of 3-5 micron and an average fiber length of 600 micron, 3 parts by weight of long ceramic fibers (alkaline earth silicate fibers) having an average fiber diameter of 3-5 micron and an average fiber length of 1500 micron, about 7 parts by weight of colloidal silica, about 0.5 parts by weight of cellulose based organic binder, and about 35 parts by weight of water, which was used as paste 2. The viscosity of the sealing material was 230 Pa·s (measured with a Bohlin rheometer, at 25° C., shear rate 1 $s^{-1}$, rotor plate-plate 40 mm diameter and GAP: 1,500/2,000 μm).

Evaluation of the Sealing Material

Two samples having a parallelepiped shape were made with paste 1 and 2, dried at 90° C. for four hours and cured at 800° C. for one hour. Each sample was tested for flexural strength by a three and four-point bending method as described in U.S. Pat. No. 4,595,662 and following the JIS R 1601:1995 standard method. The results are summarized in the following Table 1.

TABLE 1

|  |  | Flexural strength | |
| --- | --- | --- | --- |
|  | Paste | 3 points | 4 points |
| Sample 1 | 1 | 2.7 | 7.5 |
| Sample 2 | 2 | 1.6 | 6.0 |

Preparation of the Assembled Filter

Two honeycomb segments A having a rectangular shape (6×3.5×1 cm) were joined along the longer lateral face with paste 1 by forming a sealing layer having a thickness of about 2 mm, drying at 90° C. for three hours and sintering at 800° C. for one hour. The procedure was repeated by using two honeycomb segments B having the same shape and by replacing paste 1 with paste 2.

Evaluation of the Assembled Filter

Each assembly of honeycomb construction obtained as hereinabove described was tested by a four-point bending method as described in U.S. Pat. No. 4,595,662 and following the JIS R 1601:1995 standard method. The results are summarized in the following Table 2. The strength values of Table 2 indicate the pressure needed to break the assembly and are expressed in MPa.

TABLE 2

|  | Segment | Paste | Adhesion strength | Shear strength |
|---|---|---|---|---|
| Assembly 1 | A | 1 | 0.25 | 1.60 |
| Assembly 2 | B | 1 | 0.32 | 1.81 |
| Assembly 3 | A | 2 | 0.12 | 0.72 |
| Assembly 4 | B | 2 | 0.15 | 0.85 |

The data of Table 2 clearly show that Assembly 2 according to the present invention show higher values of adhesion strength and shear strength than any other comparative assembly 1, 3, and 4.

Evaluation of CTE

The coefficient of thermal expansion (CTE) was measured with a heating speed of 5° C./min starting from room temperature and until to 800° C. under an air flux of 500 ml/min. The CTE of the sintered paste 1 was compared with the CTE of the honeycomb segment. The resulting graphics were almost identical, with a non-linear expansion until to 160° C., and a linear expansion in the range of from 160° C. to 800° C. The average CTE ($\alpha$) of the sintered paste 1 in the range 160°-750° C. was $4.20 \times 10^{-6}$, while the average CTE of the honeycomb segment in the range 26°-620° C. was $4.61 \times 10^{-6}$.

The low difference of CTE allows to obtain a better resistance to thermal stress exerted during regenerating processes and operations on the honeycomb filter and a longer durability of the honeycomb filter.

The invention claimed is:

1. A method for manufacturing a honeycomb structural body comprising:
   (i) providing a plurality of silicon carbide honeycomb segments each having a cell structure and at least one outer wall;
   (ii) subjecting said honeycomb segments to an oxidizing thermal treatment forming a surface layer of silicon oxides on said at least one outer wall; and
   (iii) bonding said plurality of oxidized honeycomb segments so as to form said honeycomb structural body in substantial absence of organic binders, with interposition of a sealing material consisting of a mixture of one or more silicon carbide powders, one or more ceramic fibers, and one or more inorganic binders, wherein no organic binder is added to the sealing material and wherein the one or more ceramic fibers have a length of about 0.5 to about 50 mm.

2. The method according to claim 1, wherein (i) providing a plurality of silicon carbide honeycomb segments comprises (a) mixing one or more silicon carbide powders, one or more organic binders, one or more dispersing agents and one or more solvents to form a starting paste; (b) extruding the starting paste to form a green honeycomb structure; and (c) sintering the green honeycomb structure at a temperature of 1,500 to 3,000° C. under an oxygen-free atmosphere.

3. The method according to claim 1, wherein (ii) subjecting said honeycomb segments to an oxidizing thermal treatment comprises (d) thermally treating the honeycomb segments in an oxygen-containing atmosphere at a temperature of 500° to 1,400° C. for 1 to 15 hours.

4. The method according to claim 3, wherein (d) thermally treating the honeycomb segments is carried out at a temperature of 600° to 1,300° C.

5. The method according to claim 4, wherein thermally treating the honeycomb segments is carried out at a temperature of 700° to 1,200° C.

6. The method according to claim 1, wherein (iii) bonding said plurality of oxidized honeycomb segments comprises (e) applying a sealing layer with said sealing material on at least one outer wall; (f) joining outer walls of at least two of said honeycomb segments so as to interpose said sealing layer; and (g) curing said joined honeycomb segments.

7. The method according to claim 1, wherein said layer of silicon oxides has a thickness of 0.001 µm to 10 µm.

8. The method according to claim 1, wherein said silicon oxides are selected from amorphous and crystalline $SiO_2$, and SiO, and mixtures thereof.

9. The method according to claim 2, wherein said green honeycomb structure is dried to remove solvent and debinded to remove organic compound.

10. The method according to claim 1, wherein said honeycomb structural body comprises from 2 to 10 honeycomb segments.

11. The method according to claim 10, wherein said honeycomb structural body comprises from 4 to 8 honeycomb segments.

12. The method according to claim 1, wherein a coating layer is applied on the outer peripheral portion of said honeycomb structural body.

13. The method according to claim 1, wherein said sealing material has a viscosity value lower than 200 Pa·s.

14. The method according to claim 13, wherein said sealing material has a viscosity value of 100 to 180 Pa·s.

15. The method according to claim 1, wherein said one or more ceramic fibers are selected from the group consisting of alumino-silicate fibers, silica-alumina fibers, millite fibers, alumina fibers, silicate fibers, alkaline earth silicate fibers, basalt rock wool fibers, and fiberglass fibers.

\* \* \* \* \*